March 1, 1938.
F. GRAY
2,109,744
ELECTROOPTICAL SCANNING APPARATUS
Filed May 26, 1934
4 Sheets-Sheet 1
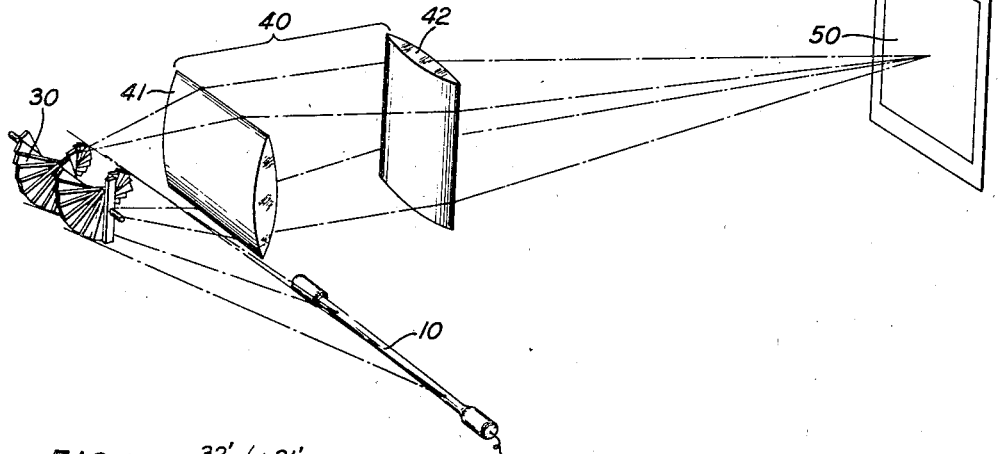
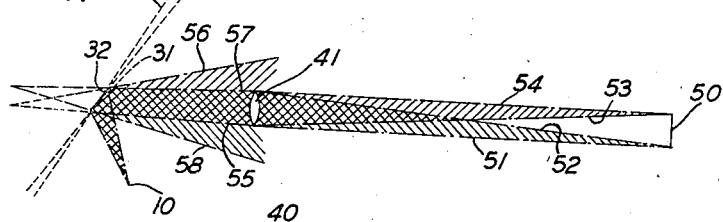
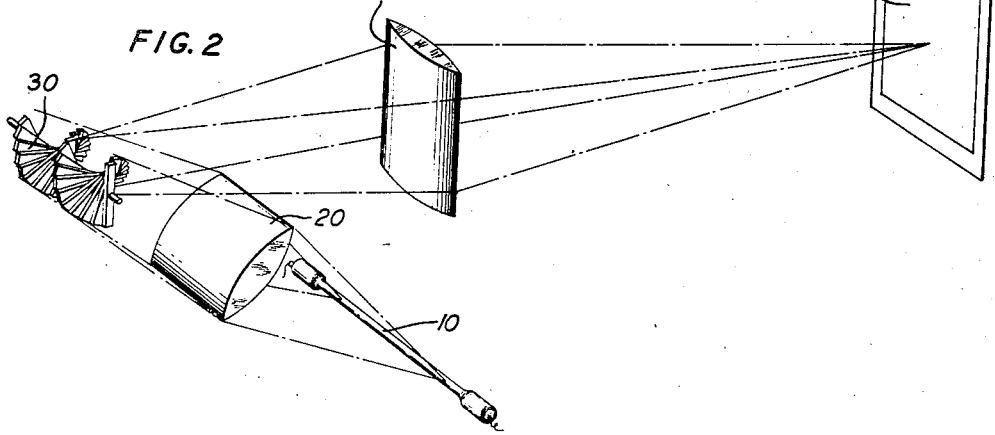
INVENTOR
F. GRAY
BY
*C. A. Sprague*
ATTORNEY March 1, 1938.   F. GRAY   2,109,744
ELECTROOPTICAL SCANNING APPARATUS
Filed May 26, 1934    4 Sheets-Sheet 2

INVENTOR
F. GRAY
BY
Ch. Sprague
ATTORNEY

March 1, 1938.  F. GRAY  2,109,744
ELECTROOPTICAL SCANNING APPARATUS
Filed May 26, 1934  4 Sheets-Sheet 3

INVENTOR
F. GRAY
BY
*Chas. Sprague*
ATTORNEY

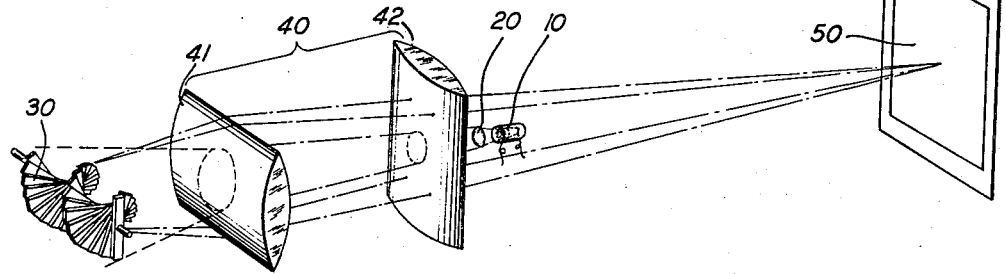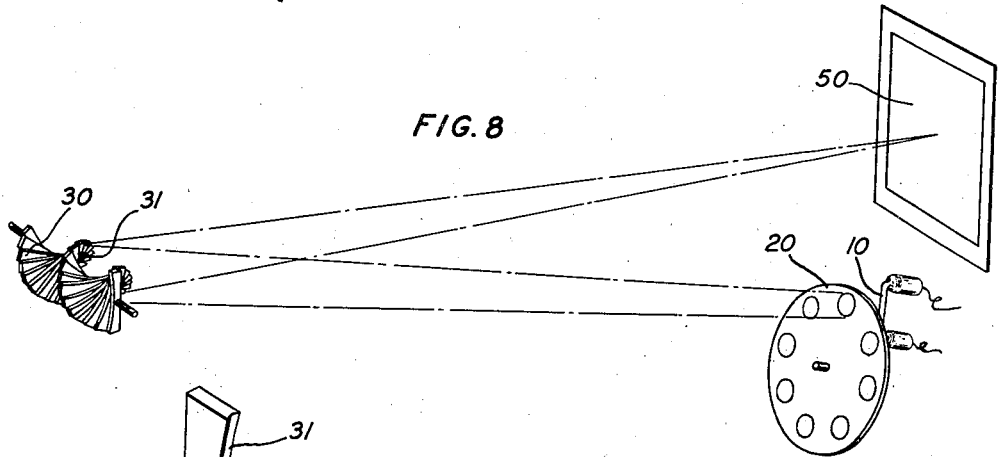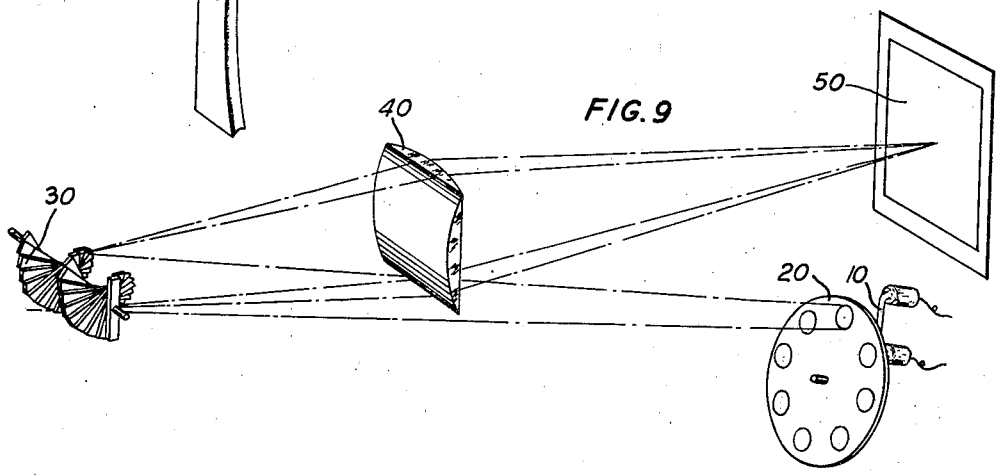

Patented Mar. 1, 1938

2,109,744

UNITED STATES PATENT OFFICE 2,109,744

ELECTROOPTICAL SCANNING APPARATUS

Frank Gray, New York, N. Y., assignor to Bell Telephone Laboratories, Incorporated, New York, N. Y., a corporation of New York Application May 26, 1934, Serial No. 727,605

3 Claims. (Cl. 178—7.3)

This invention relates to electro-optical systems and more particularly to television scanning means.

This arrangement is an improvement on the prior art scanning systems employing a mirror helix such as disclosed in the patent to D. B. Gardner 1,753,697, issued April 8, 1930. Gardner discloses a point source of light and an optical system in which the source of light must be placed at considerable distance from the mirror helix in order that the scanning light beam striking the screen shall cover a small area thereon when the screen is positioned at a reasonable distance from the mirror helix. This permits the screen and the image formed thereon to be considerably larger than the projected area of the helix if the screen is at a relatively great distance from the light source measured along the light path. This distance may be decreased by positioning the screen closer to the helix, but this results in decreasing the size of the image. The Gardner arrangement being limited to a point source of light requires very high intrinsic brilliancy of the light source which is difficult to obtain in light sources governed by an incoming television signal. The invention herein disclosed overcomes the above mentioned limitations of the Gardner arrangement and has other advantages.

An object of this invention is to provide an improved arrangement utilizing a rotating mirror helix for projecting a scanning beam of light upon an object or a field.

Another object is to provide an improved optical system for use with a mirror helix scanning device whereby the scanning beam of light is definitely limited and sharply focussed thereby upon an object or a screen.

Another object is the employment of a source of light of considerable extent at least in one direction and which may be of moderate intrinsic brilliancy, and suitable optical focussing means whereby the light is collected from at least a considerable area of the source and concentrated in a small area on an object or a screen thereby securing substantially the same result from such a source of moderate intrinsic brilliancy as would be obtained from a point source of much greater intrinsic brilliancy.

Another object is to provide means for permitting a light source to be placed relatively close to the mirror helix thereby utilizing the light much more efficiently.

Another object is to provide mirror helix scanning systems in which the brightness of the image or intensity of the scanning beam is caused to increase substantially proportionately to the area of a reflecting element of the mirror helix as that area increases, that is, as the product of the two dimensions of the reflecting area.

A further object is to increase the effective angular aperture of optical systems for projecting a moving spot of light from a rotating mirror helix.

To increase the effective angular aperture of optical systems employing a rotating mirror helix, the angular aperture in a plane passing through the axis of the helix is increased by converging light from the entire width of the strip to a point in the projection region, or much more effectively by converging light on a reflecting strip and then projecting an image of the strip. The angular aperture in a plane normal to the axis is increased by utilizing substantially the entire length of a strip to reflect light to the projection region or screen.

The arrangements described herein are thus superior to other projection methods which have no appreciable angular aperture in either plane, or at most have an appreciable aperture in only one plane.

These arrangements therefore project a much brighter spot than do other arrangements or systems of projecting from a helix. They not only converge light rays to the spot in a plane passing through the axis of the helix, but in addition they also utilize substantially the entire length of a helix element to reflect light to a given region or screen. Their angular apertures are thus far wider than any other known systems of projecting from a helix and the brightness of the projected spot is correspondingly increased.

Several modifications employing the mirror helix for directing a scanning beam are disclosed herein, especially arranged for television reception, but this system may be readily adopted for spot illumination of an object at a transmission station. With spot illumination for transmission, the light source is of uniform intensity and a light sensitive cell or cells are placed in proximity to the object in suitable positions to receive reflected light therefrom as the object is scanned.

In accordance with the present invention as applied, for example, to television reception hereinafter described in detail in several forms as illustrative of the invention, a mirror helix made up of a plurality of elongated reflecting surfaces helically mounted side by side on a rotatable shaft cooperates with a source of light of considerable extent at least in one direction, a screen, and optical means for projecting light from the source onto the mirror helix and therefrom to the screen, to produce scanning beams which are generally converging as they reach the screen and which sweep the screen in parallel paths. The reflecting surfaces of the mirror helix may either be plane or curved surfaces depending upon the other optical characteristics of the system.

In certain modifications of the arrangements described herein of projecting from a mirror helix, lenses are employed to converge the light. It is well known that a properly shaped reflector is equivalent to a lens. Such reflectors may be substituted for lenses in some of the modifications disclosed, as will be apparent. In some instances it may be particularly desirable to replace cylindrical lenses with cylindrical mirrors, particularly where large size lenses are required.

A more detailed description of the embodiments chosen for illustrating this invention follows:

Fig. 1 is a diagrammatic perspective view of a television scanning arrangement employing a plane mirror helix with a long strip light source, and a lens system between the helix and a screen, in a scanning device in accordance with this invention;

Fig. 1A is a diagrammatic showing of the paths from two reflecting strips of a mirror helix of two successive scanning beams vertically converged on a screen;

Fig. 2 is a diagrammatic perspective view of a television scanning arrangement also employing a plane mirror helix with a long strip light source, and a lens system between the source and the helix, and also between the helix and a screen;

Fig. 7 is a diagrammatic perspective view of a television scanning arrangement employing a plane mirror helix with a relatively large two-dimension light source, and a lens system between both the light source and the helix and also between the helix and a screen, the light passing twice through the same lens system;

Fig. 8 is a diagrammatic perspective view of a television scanning arrangement employing a mirror helix having spherically surfaced reflectors with a short strip light source, and a rotating lens disc in front of the strip source;

Fig. 8A is an enlarged view, but not to scale, of one of the reflecting elements of the mirror helix of Fig. 8; and Fig. 9 is a diagrammatic perspective view of a television scanning arrangement employing a plane mirror helix with a short strip light source, and a rotating lens disc in front of the strip source, and also a lens system between the helix and a screen.

Figure 3:
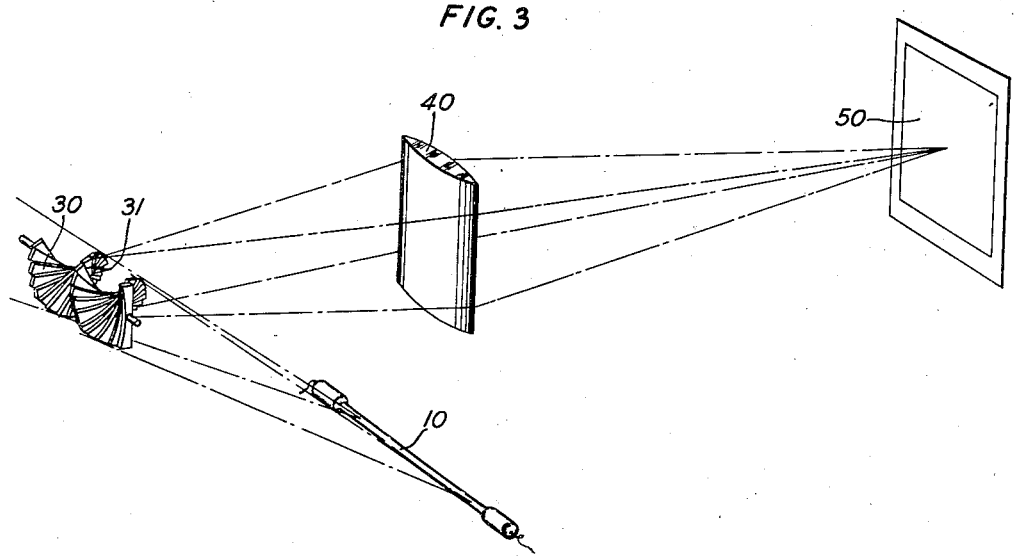
Fig. 3 is a diagrammatic perspective view of a television scanning arrangement employing a cylindrical surface mirror helix with a long strip light source, and a lens system between the helix and a screen.

In each of the different arrangements the scanning device includes a rotating mirror helix made up of a plurality of elongated reflecting strips or elements mounted side by side on a rotatable shaft, the successive strips starting from one end of the helix being equally angularly displaced with respect to the adjacent preceding strip. Usually only one edge of each strip has a light reflecting surface while all other edges are non-reflecting. The reflecting edges may be plane or curved surfaces as elsewhere described in detail. The strips and their mirror reflecting edges are so orientated on the shaft that the resulting structure has the appearance of a helix or of a twist drill, the faces of which are stepped. If only one edge of the strips is given a mirror surface, then the helix of the reflecting surfaces extends through 360° as shown in the various figures of the drawings. However, a modification may be made by giving the two opposite edges of the strips mirror reflecting surfaces which permits the spiral of the helix to extend through only 180°. The angular speed of such a helix is half that of the 360° helix. In the arrangements here shown the dimensions of the helix for a screen of a given width are not governed solely by its distance from the screen and from the light source, and consequently the dimensions of the elements of the helix may be chosen very much as desired.

This system is also adaptable to multiple channel operation. In such modification different portions of the image may be transmitted over different channels or every line of an image transmitted over each of a plurality of channels. Such modification may be made by having the necessary light elements and the different groups of the reflecting surfaces of the mirror helix suitably inclined together with other adjustments so that they simultaneously operate in their respective portions of the field and channels.

When an image of a light source is projected on a screen, the brightness of the image is determined by the aperture, that is, the area of the projecting element divided by the square of the distance from the projector to the screen. In the methods proposed for projecting from a helix, the distance from the helix to the screen is fixed by the size of the image desired on the screen. The aperture of the system is the effective area of one of the reflecting elements of the helix. To increase the brightness of the image, it is desirable to make this aperture large. This may be done, particularly in the arrangement shown in Figs. 5 to 9, by placing the source at a considerable distance from the helix. This permits a longer helix to be used, and also permits the reflectors to be made longer in a radial direction without running into impracticable F numbers for the spherical or cylindrical reflectors. F numbers are the ratio of focal length of the reflector to the length of the cord of the reflector.

Assuming that the brightness of a light source can be maintained at the same intrinsic value as its size is increased, the source should be placed far enough away from the helix to permit the largest size of reflectors that can be conveniently rotated. In case lenses are used in conjunction with plane reflecting strips, the size of the lenses may be the limiting factor. When this limit is reached there will, of course, be no advantage in moving the source farther away.

In the proposed methods, the brightness of the image increases substantially as the area of a reflecting element of the mirror helix increases, that is, as the product of the two dimensions of the reflecting area, and not merely in the ratio of one of its dimensions.

Fig. 1 is a diagrammatic perspective view of a television scanning arrangement employing a plane mirror helix with a long strip light source and a lens system between the helix and a screen. Light from the long strip source 10 controlled by a television signal is reflected from the rotating mirror helix 30 through a lens system 40 comprising cylindrical lenses 41 and 42. The lens system 40 may comprise a single lens which has a different curvature in a horizontal and in a vertical direction, or the lens system may preferably be made up of two separate cylindrical lenses 41 and 42 positioned at right angles to each other. The lens 41 compresses in a vertical direction the beam of light incident thereupon from the source 10, so that if the lens 42 were removed a narrow horizontal strip of the screen 50 would be illuminated. The source and screen are preferably at conjugate foci of lens 41. Lens 42 compresses in a horizontal direction the beam incident upon it and if lens 41 were removed a narrow vertical strip of the screen would be illuminated. The screen and effective mirror face of the helix are approximately at conjugate foci of lens 42. The net result is the forming of a spot of light on the screen. The reflecting surfaces of the mirror helix cause this spot of light to move in successive preferably contiguous vertical lines over the screen and thus illuminate it in accordance with the light tone values of the image current being impressed upon the light source and thereby produce an image on the screen.

Fig. 1A is a diagrammatic showing of two successive scanning beams produced by apparatus of the kind shown in Fig. 1, with lens 42 omitted. Two adjacent reflecting elements 31 and 32 of the mirror helix are shown, the angular position of the two mirror helix reflecting elements being such that the light directed by element 32 is just entering the field on the screen 50 and that directed by element 31 is just leaving the field. The angular displacement between the elements 31 and 32 is shown by the dotted lines 31' and 32' extending through the axis of the helix and parallel with the reflecting surfaces of the respective elements. The dimension of each of the scanning beams along a line in the plane of the drawing through the edges of the cylindrical lens 41 is at least twice the width of the lens, as here shown. Half of each of these beams is converged vertically by lens 41 to the screen where its vertical dimension is that of an elemental area, the other half passing by the top or bottom edges of lens 41 as the beam sweeps over it. Dot-dash lines 51 and 52 indicate the boundaries of the beam from mirror element 32 beyond lens 41 at the instant for which the diagram represents the light conditions and lines 53 and 54 similarly indicate the boundaries of the beam from mirror element 31. The lines 55 and 56 indicate the boundaries of the beams from mirror element 32 at the left of the lens 41 at this instant and lines 57 and 58 similarly indicate the boundaries of the corresponding beams from mirror element 31. The function of lens 42, here omitted to simplify the showing, is to converge the scanning beam in a direction at right angles to the convergence produced by lens 41 as described above. The lines extending to the left of the mirror helix reflecting elements 31 and 32 indicate at their crossing points the respective virtual image points for these elements for the light source 10.

Fig. 2 is a diagrammatic perspective view of a television scanning arrangement also employing a plane mirror helix with a long strip light source and a lens system between the source and the helix and also between the helix and the screen. This arrangement is a modification of that shown in Fig. 1. The modification comprises placing a lens system 20 composed of a cylindrical lens between the light source 10 and the mirror helix 30. A second lens system 40 composed of a cylindrical lens is positioned between the mirror helix and the screen 50. The cylindrical lens 20 forms an image of the strip light source 10 on the screen 50, in a vertical direction and the cylindrical lens 40 forms an image of a reflecting surface of the mirror helix on the screen in a horizontal direction. The screen is thus traversed by a moving spot of light.

Fig. 3 is a diagrammatic perspective view of a television scanning arrangement employing a cylindrically surfaced mirror helix with a long strip light source and a lens system between the helix and a screen. In the two arrangements above described the reflecting surfaces of the mirror helix were plane, while in this arrangement the reflecting surfaces 31 are cylindrical. This arrangement eliminates one of the cylindrical lenses of the previously described arrangement since the cylindrical surfaces of the mirror helix form an image of the light source on the screen in a vertical direction and a single cylindrical lens forms an image of the strip reflectors of the mirror helix on the screen in a horizontal direction. This arrangement consists of a strip light source 10, a mirror helix 30 having its reflecting surfaces cylindrical, a cylindrical lens 40 and a screen 50. This arrangement scans the screen by a spot of light in a series of parallel lines.

Figure 4:
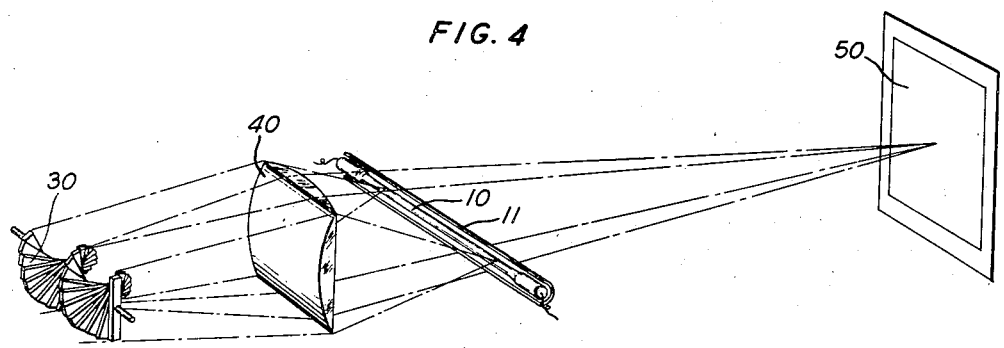
Fig. 4 is a diagrammatic perspective view of a television scanning arrangement employing a plane mirror helix with a long strip light source, and a lens system between both the source and the helix and also between the helix and a screen, the light passing twice through the same lens system.

Fig. 4 is a diagrammatic perspective view of a television scanning arrangement employing a plane mirror helix with a long strip light source and a lens system between both the source and the helix and also between the helix and a screen, the light passing twice through the same lens system. This arrangement comprises a long light source 10 from which light from the side towards the screen is cut off by the opaque shield 11, a lens system 40 comprising a lens having two different cylindrical curvatures so that it forms an image of the light source on the screen in a vertical direction, and an image of a reflecting surface of the mirror helix on the screen in a horizontal direction, a mirror helix 30 having plane reflecting surfaces, and a screen 50. The strip light source 10 is preferably positioned in a plane through the axis of the mirror helix and the center of the screen. As the light source is relatively narrow, its obstructive effect is to only slightly diminish the amount of light reaching the screen.

In all the aforegoing arrangements the light source may be substantially shortened by utilizing a form of the mirror helix shown and described in Patent No. 2,017,092 of Frank Gray, patented Oct. 15, 1935, Figs. 3 to 8. In this form the reflecting surfaces of the strips of the mirror helix are, at progressively different angles with the axis of the helix so that they can each reflect light in the desired direction from a source of less extent than would otherwise be required.

In the usually proposed methods for projection on a screen a small spot of light is secured thereon by projection from a point source. In the arrangements above described a strip light source is employed. An alternative method that has certain advantages is to utilize light from a relatively large source extending in two directions and project an image of an illuminated lens or a small area of the source on the screen. This method demands a long focal length projector. The mirror helix furnishes this feature and presents the possibility of efficient projection. This feature is especially shown in the next two arrangements described herein.

Figure 5:
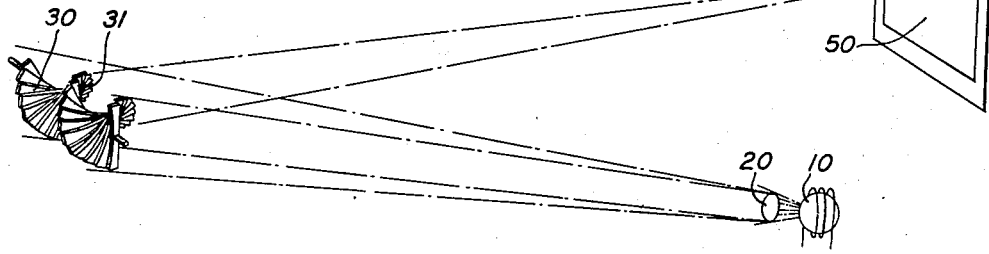
Fig. 5 is a diagrammatic perspective view of a television scanning arrangement employing a mirror helix having spherically surfaced reflectors, with a relatively large two-dimension light source, and an optional lens system between the source and helix.
Figure 5A:
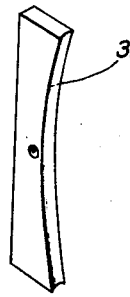
Fig. 5A is an enlarged view, but not to scale, of one of the reflecting elements of the mirror helix of Fig. 5.

Fig. 5 is a diagrammatic perspective view of a television scanning arrangement employing a mirror helix, each strip of which is spherically surfaced, with a relatively large two-dimension light source, and an optional lens system between the source and the helix. This arrangement comprises an extended light source 10 which illuminates a spherical lens 20 which forms an image of the source covering the rotating mirror helix 30 from which the light is convergingly reflected and forms a moving spot of light on the screen 50. The lens 20 and the spot of light on the screen 50 are preferably at conjugate foci of the acting reflecting strip of the mirror helix. The reflecting surfaces 31 of the mirror helix 30 are concave in both directions as shown for the middle section strip of the helix in Fig. 5A. The radius of curvature of the reflecting surfaces of the mirror helix should ordinarily be about equal to the distance between the helix and the screen. The distance from the lens 20 to the helix will then also be about equal to the radius of curvature of the mirror elements. This will ordinarily permit the spot of light on the screen to be of practical size. Obviously, however, in the drawings the size of the lens 20 and the light source 10 are greatly exaggerated but the spot of light on the screen has not been correspondingly exaggerated. The lens 20 may even be omitted and an apertured screen used to define the size of the light source, in which case it is desirable that the source have sufficient intrinsic intensity. As a further modification the light source may be made sufficiently small so that it may be used without either a lens or an apertured screen in front of it. The reflecting surfaces may be ground by turning all of the elements of the helix so that their backs are in the same plane and grinding the face of each element so that the principal axes of all of the reflecting surfaces are normal to the axis of the helix, that is, the centers of curvature of the surfaces may be equally spaced along a line parallel with the axis of the helix, in which case the width of the image field formed on the screen would be about twice the length of the helix; or the principal axis of successive reflectors may be inclined at a small angle with respect to each other, in which case the width of the image field formed on the screen may be either narrower or wider than the length of the helix. For practical construction this angle may be substantially the same between the succeeding pairs of reflectors. The helix may be as long as or even longer than the screen in a horizontal direction or it may be shortened provided that the various reflecting surfaces are inclined at suitable angles to the axis of rotation to reflect successive scanning lines to the proper position on the screen. For a more detailed description of how helices having curved reflecting faces may be made, reference is made to the patent of Frank Gray, No. 2,017,092 supra.

Figure 6:
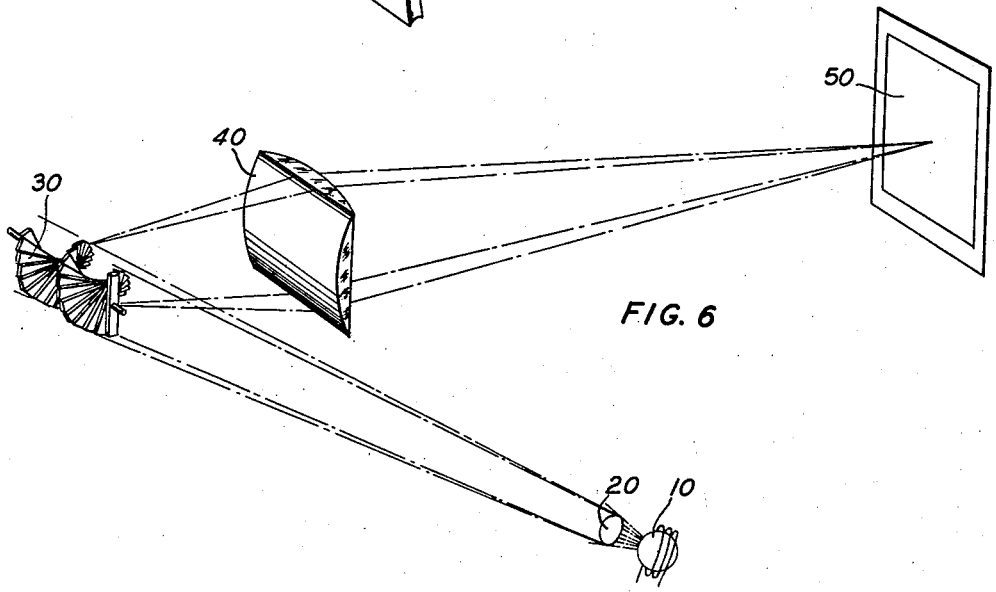
Fig. 6 is a diagrammatic perspective view of a television scanning arrangement employing a plane mirror helix with a relatively large two-dimension light source, and an optional lens system between the source and the helix, and a lens system between the helix and a screen.

Fig. 6 is a diagrammatic perspective view of a television scanning arrangement employing a plane mirror helix with a relatively large two-dimension light source and an optional lens system between the source and the helix, and a lens system between the helix and a screen. This arrangement is a modification of that shown in the preceding arrangement in which, instead of concave reflecting surfaces on the mirror helix, plane reflecting surfaces are used in conjunction with a large fixed lens system in the optical system. This arrangement comprises an extended light source 10, a lens 20, a mirror helix 30 having plane reflecting surfaces, a lens system 40 comprising a large double cylindrical lens having its two cylindrical faces positioned at right angles to each other and the screen 50. The lens system 40 may either be in the form of a single lens or preferably in the form of two separate cylindrical lenses placed at different positions similar to that shown in Fig. 1. The lens system 40 forms an image of lens 20 on the screen. In this arrangement the lens system 40 may alternatively be placed between the light source and the mirror helix. This lens system may also be in the form of a spherical lens if the successive reflectors in the mirror helix are properly inclined with its axis. Also in this arrangement the lens 20 may be omitted and the alternatives described in connection with Fig. 5 used.

Fig. 7 is a diagrammatic perspective view of a television scanning arrangement employing a plane mirror helix with a relatively large two-dimension light source, and a lens system between both the light and the helix and also between the helix and a screen, the light passing twice through the same lens system. This arrangement comprises an extended light source 10, a lens 20, a lens system 40 consisting of a double cylindrical lens or preferably two cylindrical lenses 41 and 42 spaced and positioned with their axes at right angles to each other, a mirror helix 30 having plane reflecting surfaces, and a screen 50. The light from the light source is passed through the lens system 40 first in a direction towards the mirror helix and reflected back through this lens system and onto the screen. The light source and the lens system are positioned in a straight line passing through the center of the helix and the screen but as the light source is relatively small its obstructive effect, as a small obstacle in the large light path, is to only somewhat diminish the amount of light reaching the screen. This arrangement insofar as it concerns the light passing twice through the lens system is similar to that shown in Fig. 4 in which a strip light source is used. The rotation of the mirror helix causes a spot of light to successively scan the field in a series of parallel lines.

Fig. 8 is a diagrammatic perspective view of a television scanning arrangement employing a mirror helix having reflecting surfaces which are concave both transversely and longitudinally, with a short strip light source and a rotating lens disc in front of the strip source. This arrangement comprises a short strip light source 10, a rotating lens disc 20, a mirror helix 30 made up of strip reflecting surfaces 31 curved in two directions, as shown more clearly in Fig. 8A, and a screen 50. The radius of curvature of each of the reflecting surfaces of the strips of the mirror helix is preferably about equal to the distance from the helix to the screen as in the arrangement of Fig. 5. In this arrangement a lens in the rotating lens disc successively forms an image of the source on the mirror helix and sweeps the image along at a speed to illuminate the reflecting strip of the mirror helix in action. The rotating mirror helix and slowly rotating lens disc are moved together, as by gearing, so that one of the lenses in the lens disc passes the strip light source as the mirror helix makes one revolution. The reflecting surfaces of the mirror helix are concave in both directions to form an image of a lens in the lens disc 20 on the screen. This arrangement has certain advantages since an intense short strip source of light is more easily obtained than a source extending in two directions, and also since a comparatively short strip light source may be operated at a lower voltage than a longer light source.

A modification of this arrangement is to use a mirror helix whose reflecting surfaces are concave along their length only. In this case the lenses in the rotating lens disc form an image of the strip source on the screen in a horizontal direction and the reflecting surfaces of the mirror helix form an image of a lens in the rotating lens disc on the screen in a vertical direction which results in a moving spot of light scanning the screen.

Fig. 9 is a diagrammatic perspective view of a television scanning arrangement employing a plane mirror helix with a short strip light source and a rotating lens disc in front of the strip source and also a lens system between a helix and a screen. This arrangement comprises a short strip light source 10, a rotating lens disc 20 in front of the light source, a rotating plane mirror helix 30, a lens system 40 and a screen 50. The lens system 40 may comprise a double cylindrical lens. The curvatures of this lens are crossed at right angles and the curvatures have different focal lengths so as to focus in one plane an image of a lens in disc 20 on the screen and to simultaneously focus in a transverse plane an image of a reflecting strip of the mirror helix on the screen. However, the lens 40 may be cylindrical in one direction only provided the lenses in disc 20 form an image of the lamp on the screen in a direction transverse to that of the cylindrical lens.

While the specific arrangements shown in the drawings, as already pointed out, are particularly adaptable for production of images in a television receiver, the television scanning and projection apparatus as shown herein may be used to scan an object or a scene, with a spot of light in spot scanning, or to scan an object illuminated by flood lighting, for the generation of photoelectric currents for television transmission. Any of the methods described herein may be used for this purpose by employing a suitable light source and properly adding the necessary light sensitive cells.

What is claimed is:

1. A strip light source, means for impressing incoming television signal currents upon said light source, a screen, and means for projecting light from said source to said screen to produce beams which are generally converging as they reach the screen and sweep the screen in parallel paths, said means comprising light converging means and a rotatable scanning element made up of a plurality of elongated reflecting surfaces helically positioned about the axis of rotation, said light converging means comprising a rotatable element carrying a plurality of converging lenses.

2. A strip light source, means for impressing incoming television currents upon said light source, a screen, and means for projecting light from said source to said screen to produce beams which are generally converging as they reach the screen and sweep the screen in parallel paths, said means comprising light converging means and a rotatable scanning element made of a plurality of mirror faces spherically shaped to focus a spot of light on the screen in all directions and helically positioned about the axis of rotation, said light converging means comprising a rotatable element carrying a plurality of converging lenses.

3. A strip light source, a field to be illuminated element by element with a moving spot of light, and means for projecting light from said source to said field to produce beams which are generally converging as they reach the field and sweep the field in parallel paths, said means comprising light converging means and a rotatable scanning element made up of a plurality of elongated reflecting surfaces helically positioned about the axis of rotation, said light converging means comprising a rotatable element carrying a plurality of converging lenses.

FRANK GRAY.